United States Patent [19]
Ackeret

[11] Patent Number: 4,780,976
[45] Date of Patent: Nov. 1, 1988

[54] CONTAINER FOR ACCOMMODATING A PILE OF PICTURES

[75] Inventor: Peter Ackeret, Kusnacht, Switzerland

[73] Assignee: Licinvest AG, Chur, Switzerland

[21] Appl. No.: 901,531

[22] PCT Filed: Nov. 12, 1985

[86] PCT No.: PCT/EP85/00611

§ 371 Date: Jul. 11, 1986

§ 102(e) Date: Jul. 11, 1986

[87] PCT Pub. No.: WO86/03025

PCT Pub. Date: May 22, 1986

[51] Int. Cl.[4] .......................................... G09F 11/30
[52] U.S. Cl. ........................................ 40/511; 40/513; 40/661
[58] Field of Search ...................... 40/511, 513, 99

[56] References Cited

U.S. PATENT DOCUMENTS

| | | | |
|---|---|---|---|
| 3,696,537 | 10/1972 | Alleman | 40/511 |
| 4,241,528 | 12/1980 | Ackeret | 40/511 |
| 4,241,529 | 12/1980 | Baur | 40/511 |
| 4,245,417 | 1/1981 | Ackeret | 40/513 |
| 4,245,417 | 1/1981 | Ackeret | 40/513 |

FOREIGN PATENT DOCUMENTS 2822851 11/1979 Fed. Rep. of Germany.
2403574 4/1979 France.

Primary Examiner—Gene Mancene
Assistant Examiner—Wenceslao J. Contreras
Attorney, Agent, or Firm—Jeffrey H. Ingerman

[57] ABSTRACT

A container for accommodating a pile of pictures, having a picture exchanging mechanism, is provided. The container has a window under which the pile of pictures is held in a viewing and storage position. At least one picture in the pile can be pulled out on a slider member such that when the slider member is pushed back in, the at least one picture is returned to the other end of the pile, so that a different picture can be viewed in the window. A hold-down member which prevents the withdrawn picture or pictures from falling out of the slider member while the slider member is pulled out is at least partially retracted when the slider member is pushed back in, so that it is not visible in the window.

44 Claims, 9 Drawing Sheets

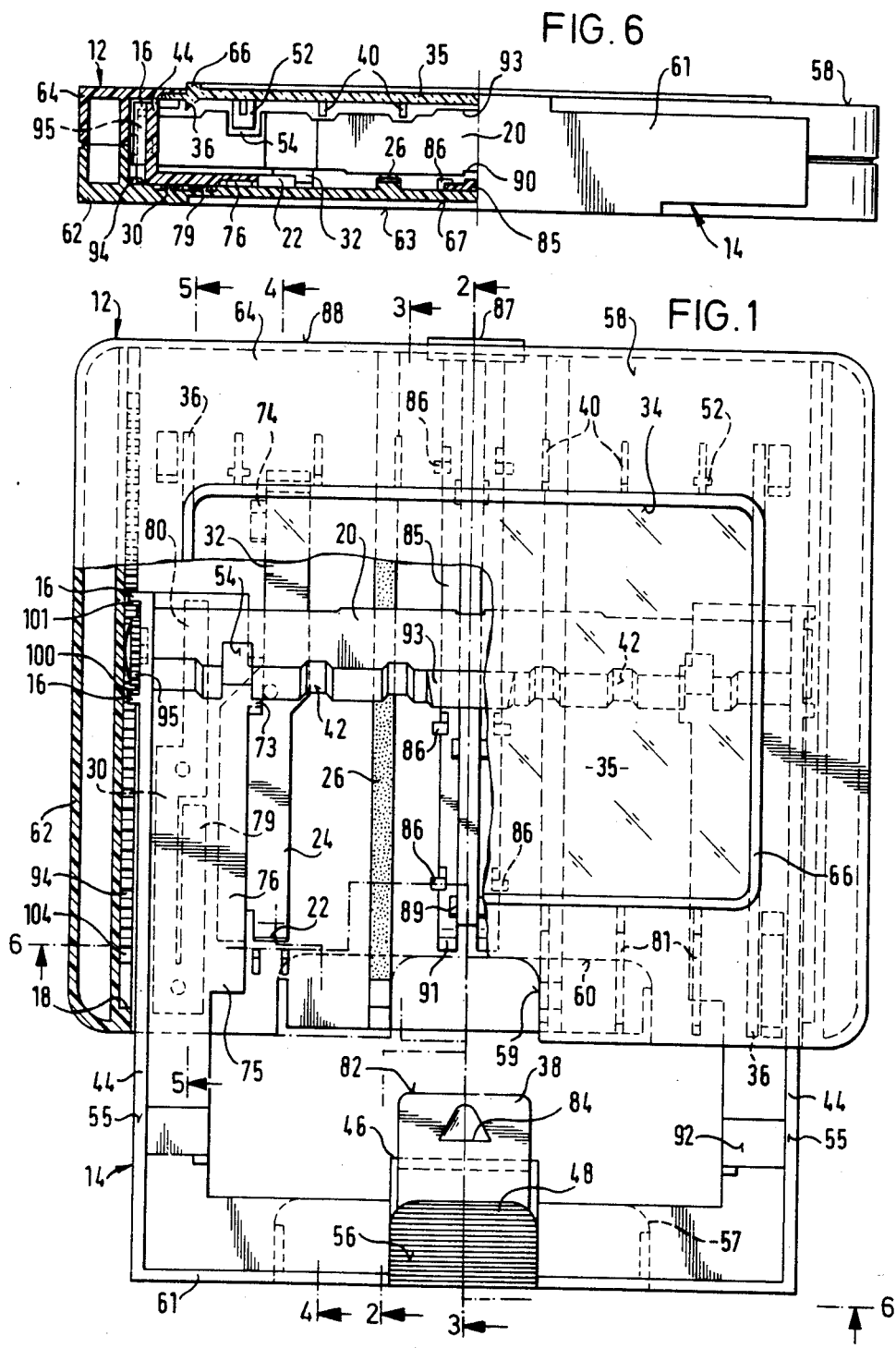

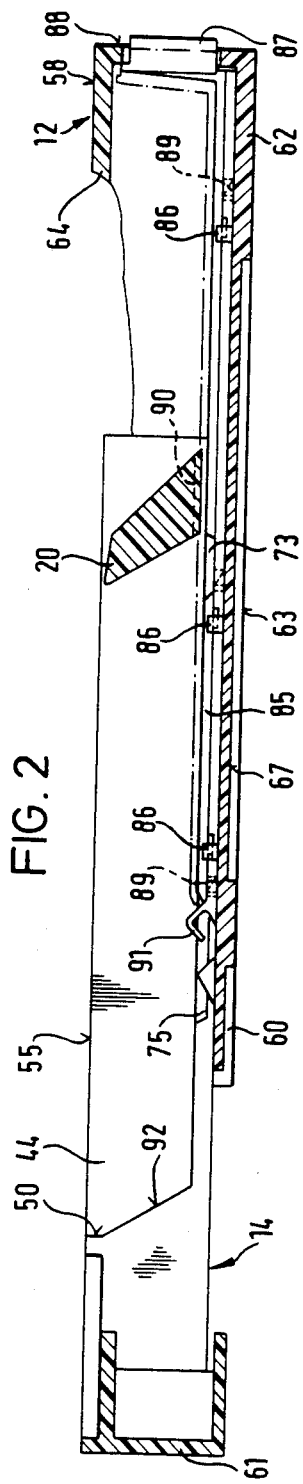
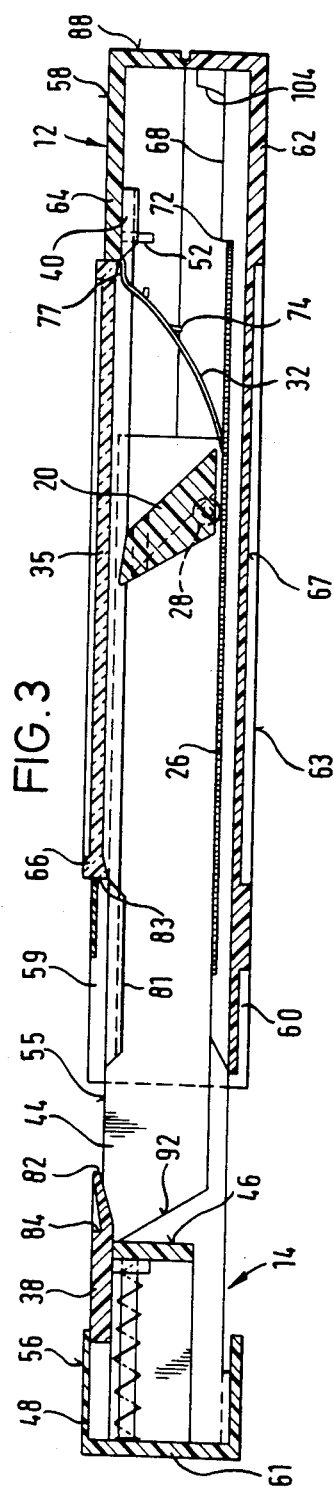

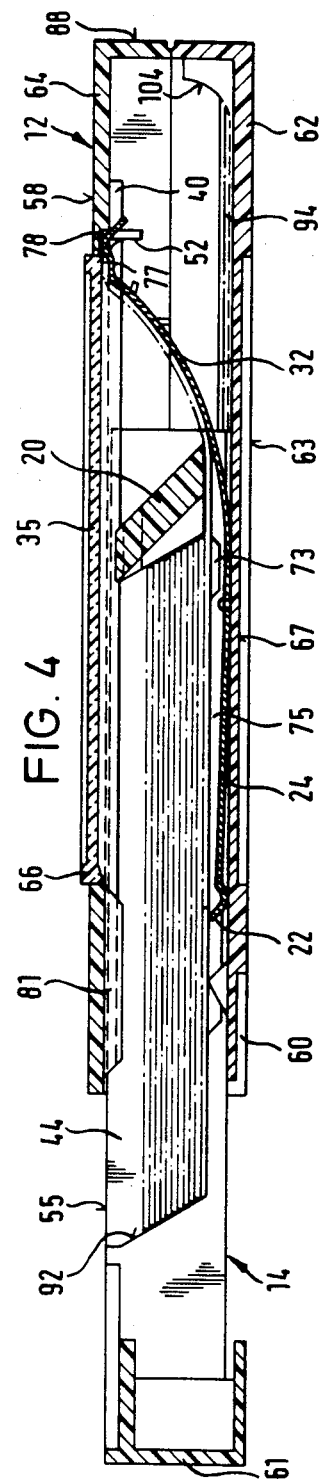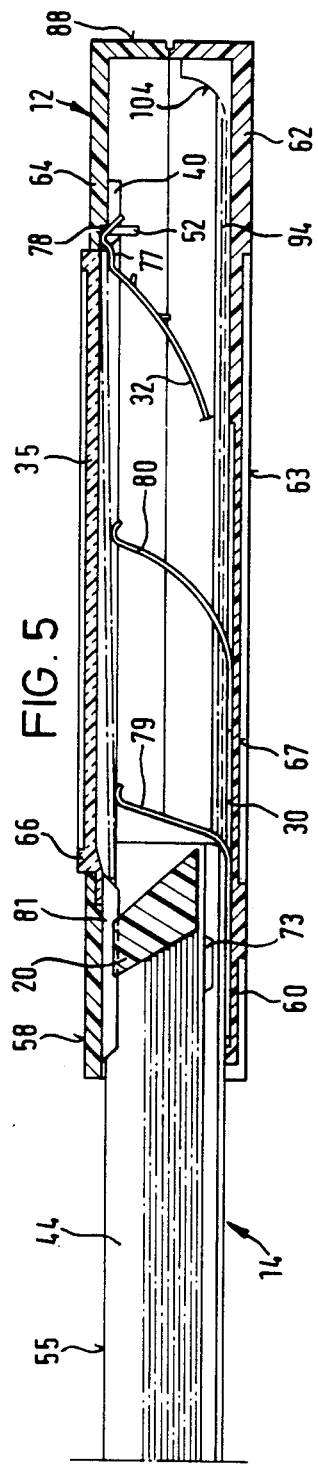

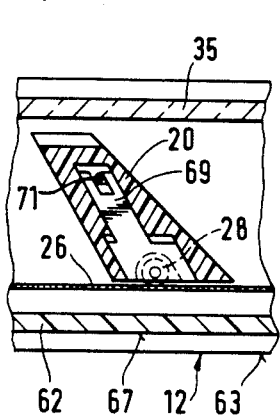
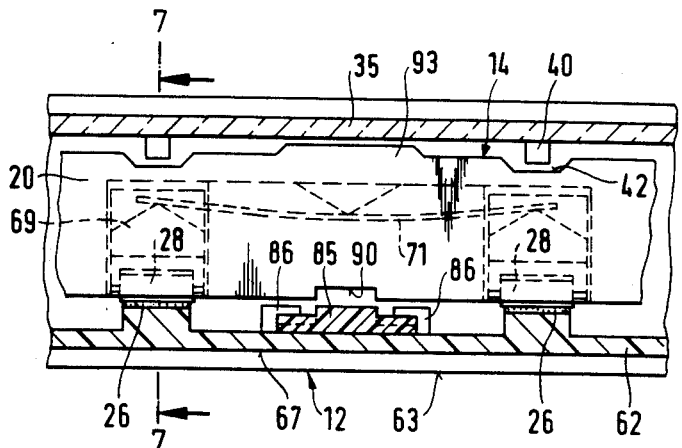
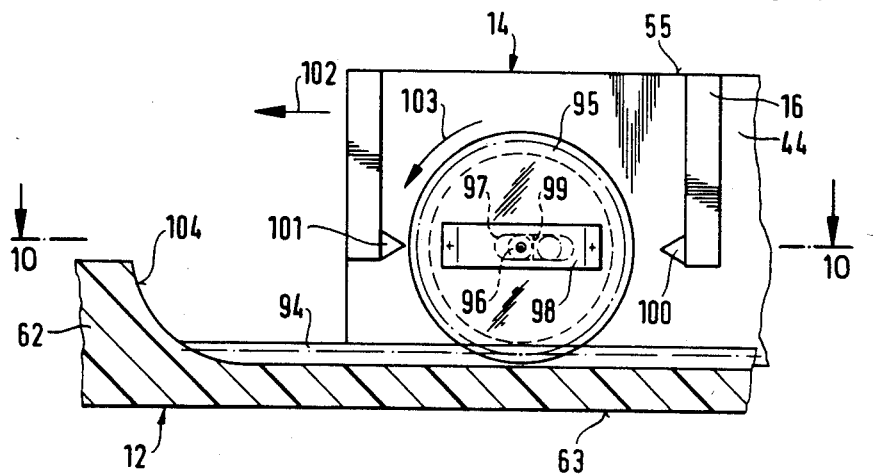
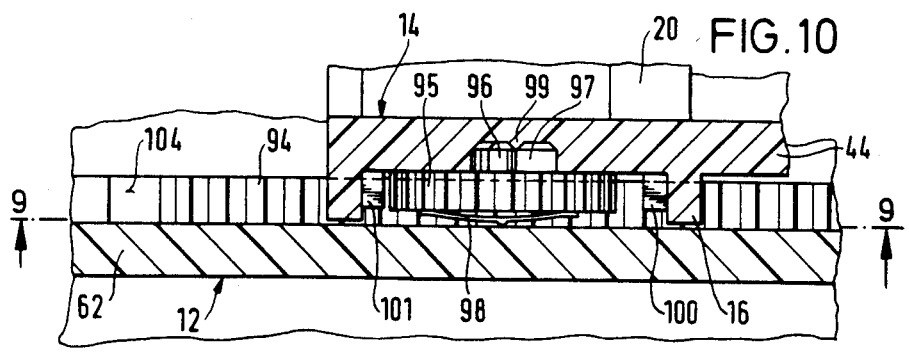

FIG. 20
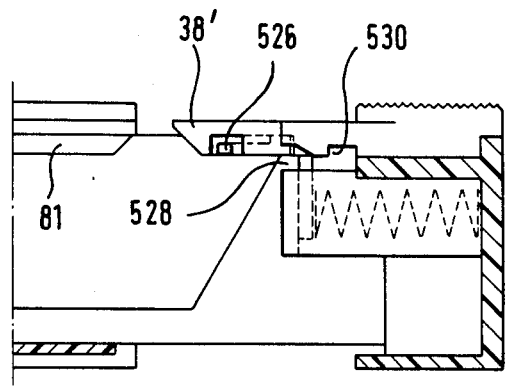
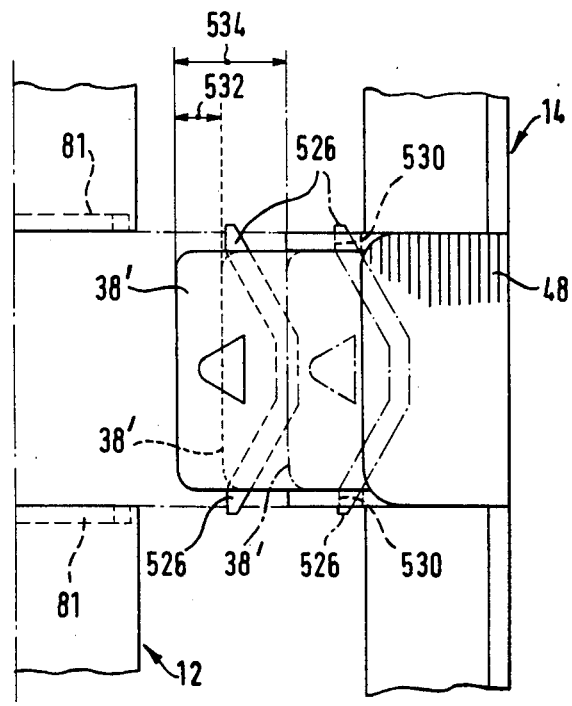
FIG. 19

CONTAINER FOR ACCOMMODATING A PILE OF PICTURES

The invention relates to a container for accommodating a pile of pictures, that is to say a pile of rectangular pictures of like format, these preferably being photographic prints.

Containers of that general type, designed as picture changers for the cyclic rearrangement of pictures, are described in U.S. Pat. Nos. 4,238,898, 4,238,899, 4,241,528, 4,241,529, 4,245,417, 5,259,802 and 4,376,348. These known containers comprise a housing with a viewing window under which the pile of pictures lies and through which as far as possible the whole of the picture area of the picture facing the window is to be visible. A slider member which houses the pile of pictures can be pulled out of, and pushed back into, the housing parallel to the plane defined by the window. On each complete cycle of movement of the slider member, a picture is taken from one end of the pile, thus remaining in the housing, and added again to the other end of the pile. Problems arise if the pictures are photographic prints owing to the generally bowed form of the pictures which—if special steps are not taken—protrude from the withdrawn slider member. But even flat pictures could fall out of the slider member if the container were opened, for example, overhead. The features provided in the prior art to avoid this falling out or protrusion are holding-down members attached to the slider member which engage over the edges of the pile that extend parallel to the direction in which the slider member is pulled out or also over the edges extending transversely thereto.

To ensure adequate reliability, these holding-down members are accordingly wide. They thus cover the outer surface regions of the picture, which is to be exposed as fully as possible in the viewing window. This applies above all to the front end holding-down member if this member, during relative movement between the picture facing the window and the window itself, is to space the picture from the window in order to prevent the window from being scratched on the inside, for in that case the holding-down member should engage quite substantially over the relevant picture edge.

In vew of these problems, the invention proposes a container for a pile of rectangular or square pictures of like format with a housing which is provided with a viewing window, matching the picture format, for the uppermost picture of the pile, and with a slider member, which can be pulled out of and pushed back into the housing parallel to the plane of the window, for removing at least one picture from the housing, which slider member has in the region of its front wall a movable holding-down member, the holding down member being spring-biassed into a projecting position in which it engages over the at least one picture in the withdrawn slider member.

The holding-down member thus fulfils the abovedescribed functions when the slider member is pulled out, that is to say it ensures that none of the pictures transported out of the housing in the slider member fall out, and it can also meet the spacing requirement. If, however, the slider member is pushed into the housing, it can be moved away from the viewing area of the window, preferably by running up against a stop member; it is preferred that in this displaced position it still just overlaps the pile of pictures. In addition, or alternatively, further holding-down members may be moulded onto the housing which act on the same edge of the pile of pictures and assist in the spacing function.

The development according to the invention is applicable equally well to picture changers as to containers without such a changeover function.

Preferred embodiments of the invention are defined in the sub-claims and are explained in detail hereinafter with reference to the accompanying drawings.

FIG. 1 shows in plan view, and partially cut-away, a container according to the invention designed as a picture changer, in which the slider member is shown partially withdrawn.

FIGS. 2 to 10 show sections and details of the picture changer of FIG. 1.

FIGS. 19 and 20 show a further embodiment of a holding-down member.

Figure 11:
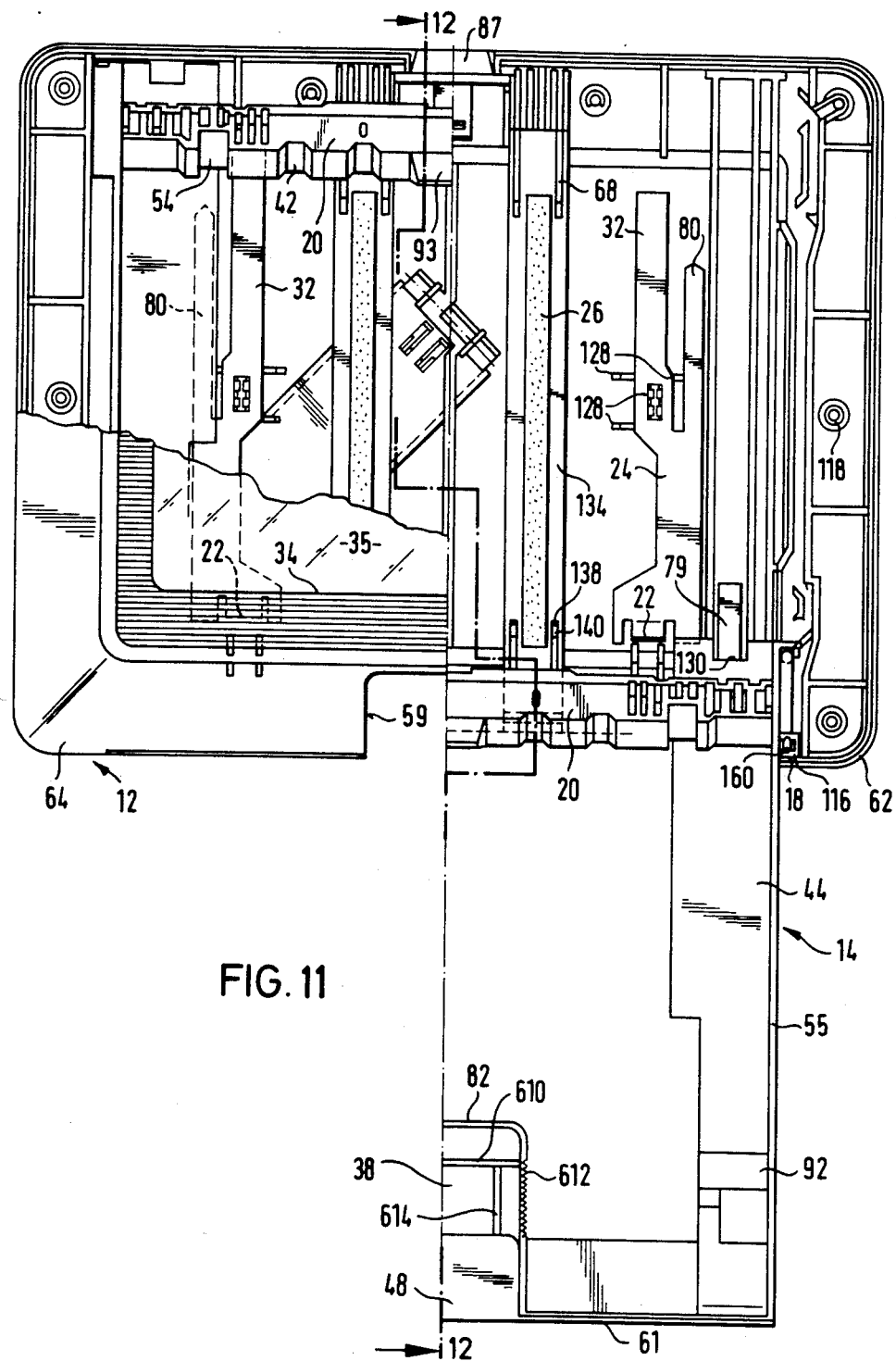
FIG. 11 shows a further embodiment of a picture changer in plan view and partially cut-away with a withdrawn slider member shown in one half of the Figure.
Figure 12:
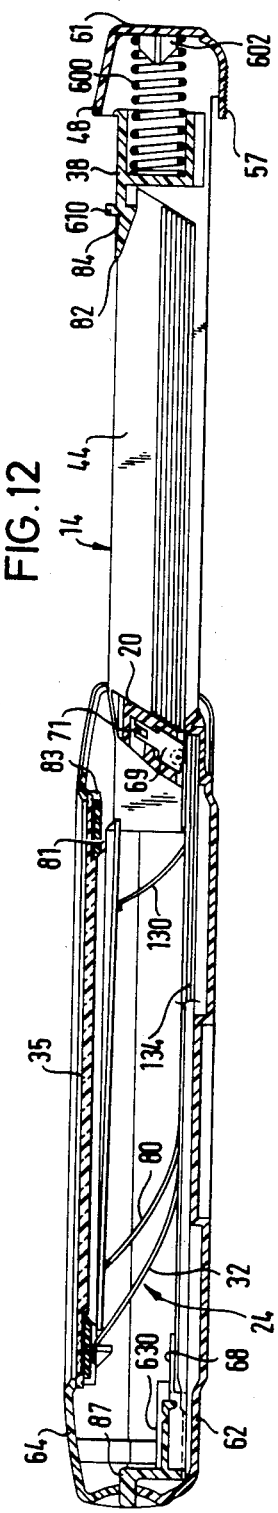
FIGS. 12 to 15 show sections and details of the picture changer of FIG. 11.
Figure 13:
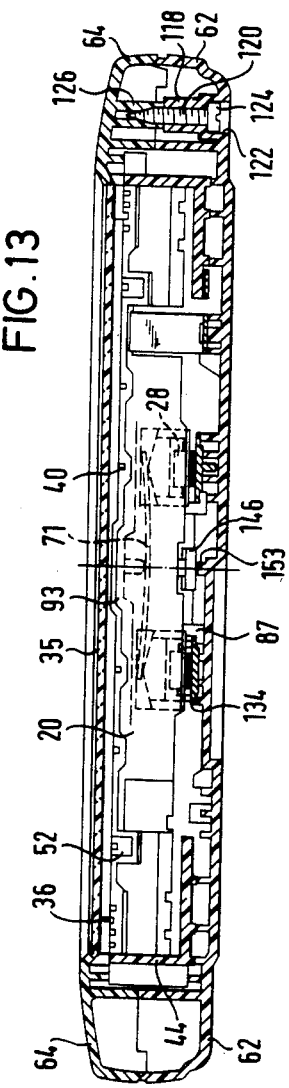
Figure 14:
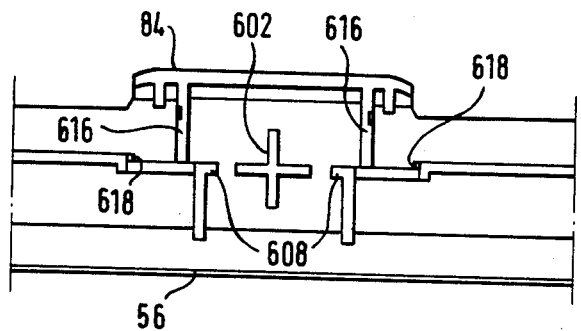
Figure 15:
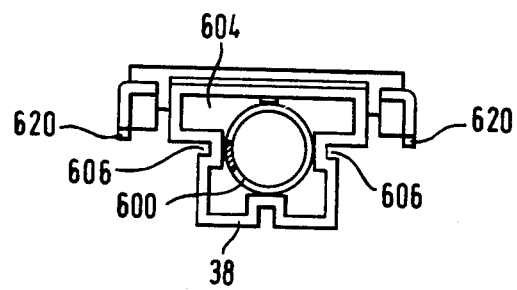

The picture changer shown in FIGS. 1 to 10 comprises as first frame part a housing 12 and as second frame part a slider member 14 for accommodating a pile of pictures, wherein the slider member 14 can be pulled out of the housing for a distance limited by stop members 16 on the slider member and complementary stop members 18 on the housing and pushed back in again. The separating means is formed by a separator bar 20. The feeding means is embodied by hook-like members 22 which are located on leaf-spring type spring arms 24. The retaining means for holding the remainder of the pile in the slider member is likewise formed by the separator bar, whilst the separated individual picture is held in the housing by the co-operation of rails, arranged fixedly in the housing and provided with a retentive coating 26, with rollers 28 that hold the individual picture firmly against the rails and are caused to rotate as a result of contact with the rails. Finally, the guide means is embodied by pairs of leaf springs 30 and spring arms 32, the spring arms 32 being formed integrally with the spring arms 24.

In the inserted state of the slider member 14, the spring arms 24 and 32 press the pile of pictures (not shown in FIG. 1) against a viewing window, the inner border of which is denoted by 34. The picture which is then uppermost in the pile, a photographic print, is intended to lie as flat as possible; to that end, at its periphery it is supported in a plane that is defined by lateral ribs 36, by the underside of a slidable catch 38 and, at the opposite end, by ribs 40 moulded on the housing.

FIG. 1 shows the partially withdrawn position of the slider member 14. In the inserted state, the separator bar lies on the other side of these ribs 40; however, because it projects further towards the window 35 which corresponds to the height of these ribs, it has recesses 42 so that the ribs are able to pass through.

The edges of the pile are supported laterally, (that is, parallel to the withdrawal direction) by side pieces 44 of the slider member. At the front, that is, on the side of the slider member that is furthest away from the housing when the slider member is withdrawn, the edges are supported by the stop face 46 of a centrally arranged grip part 48 that the user may grip and by lateral stop faces 50 on the slider member. At the opposite end, the edges of the photographs are supported against stop members 52 moulded on the housing, for the passage of which the separator bar likewise has recesses 54 that are substantially deeper than those for the ribs 40.

The rib 36 extends further into the interior of the slider member than the height that is defined by the top edge 55 of the side pieces of the slider member so that the photographs are unable to slide out laterally over the side pieces of the slider member. An analogous action occurs between the separator bar on the one hand, the ribs 40 on the other.

The grip part 48 has a top part 56, arranged on the window side of the housing, and a bottom part 57 which is wider than the top part; the top wall 58 of the housing, surrounding the window in the manner of a frame, has a cut-out 59 in the region of the top part whilst the opposing housing wall is recessed at 60 in a complementary manner for the bottom part 57. Accordingly, in its closed state the device has a closed, substantially rectangular outline without any protruding parts.

The housing and the slider member are injection-moulded plastics parts. The slider member is a one-piece element, comprising side-pieces, separator bar, grip part and a front wall 61 joining the grip part to the side pieces, which are of L-shaped cross-section.

The housing is composed of three parts: the bottom shell 62 providing the base 63, the frame-like upper shell 64 with the window aperture, and the window 35 set into this. The housing is reinforced in the direction of the slider member movement in that the struts between the top and bottom wall are constructed as double supports, as shown in FIG. 6. The housing parts can be welded together, or a snap-fit connection may be provided.

Around its main surface the window has a narrow border 66 that protrudes slightly outwards, so that it is somewhat proud in respect of the frame surrounding it. A recess that is complementary with the outline of this edge on the outside of the opposite bottom wall is denoted by the numeral 67 and permits several housings to be stacked one on top of the other.

When the slider member is withdrawn from the housing, it is gripped using one hand at the top and bottom parts of the grip part, whilst the other hand holds the housing. The hook-like members 22 engage the front edges of the photographs lying on the spring arm ends, that is the edges frrthest away from the separator bar, as a result of which a certain number of photographs, depending on the height of the hook-like members, is fed to the separating means. This is basically formed as a through-gap which is defined, firstly, by (in the example of execution) two lands 68 moulded on the base of the housing on the inside and, secondly, by the underside of shoes 69 that oppose the lands, the shoes being inserted into the separator bar and shown in FIG. 7 in section and in FIG. 8 in front view.

Each land 68 is associated with a respective shoe 69 and the land/shoe arrangements are located on both sides of the plane of symmetry 70 of the device. The shoes are guided longitudinally in the separator bar, are supported on a knife-edge-like bearing and biassed by an inserted wire spring 71. Each shoe additionally accommodates a small roller that is rotatable about an axis at right angles to the withdrawal direction and the small roller 28 projects slightly from the shoe.

FIG. 3 shows the position of the lands 68 which protrude by fully the thickness of a photographic print further above the level of the base of the housing than the surface of the retentive coating 26. In the rest or closed position of the slider member, the lowermost portion of the shoes is spaced somewhat from the edge 72 of the land, and the surface of the separator bar facing towards the pile is sloped, somewhat like a wedge, such that, as the separator runs onto the edge of the pile, the photographs, on the opposite edge of which the hook-like members 22 are acting, "migrate" downwards along the oblique face towards the edge 72 of the lands facing them. There is sufficient room between the shoes 69 and the retentive coating 26 for the leading edge of a single photograph alone (the lowest in the pile) to be able to enter the gap forming between the shoes 69 and the retentive coatings 26, for as long as this gap is held open by the land 68 as will be explained. All the other photographs transported with the hook-like member 22 come up against the separator itself or against the shoes thereof with the result that the hook-like members slip off the extreme edge of the photographs.

When the rear edges (in the withdrawal direction) of the shoes 69 have passed the edge 72 of the lands 68, the shoes drop under the action of the wire spring 71, the rollers 28 positioning themselves on the individual photograph that has been separated in this manner and pressing it onto the associated retentive coatings so that it is firmly held in the housing, that is, the first frame part. The remainder of the pile is transported by the separator together with the slider member to the outside until the slider member has been fully withdrawn.

Care should be taken therein that the separator bar also runs over the spring arms 32. So that they do not stress the separated picture from below during the passage of their ends acting on the pile, during a certain phase of the withdrawal movement they are pressed mechanically towards the base of the housing. Spring-depresser members 73 moulded onto the slider member side pieces 44 are used for this purpose; these spring-depresser members pass over projections 74 extending laterally from the spring arms and hold the arms for a part of the withdrawal movement corresponding to the length of the spring depresser members. Further spring-depresser members 75 on the slider member side pieces run onto the spring arms 24 at the enlarged portion 76 as soon as the individual photograph has been safely held between the retentive coating and the rollers, and press these arms likewise away from the viewing window so that further photographs can be introduced and others removed without hindrance.

On the side of the separator furthest from the pile the spring arms 32 are released again after travelling a short distance so that they again act from beneath the separated photograph and guide its rear edge gradually towards the window. Finally, this edge positions itself under the influence of the springs against the upper side of the housing. Because the free ends of the spring arms are rounded, but this edge shall on the other hand be firmly held at the position it has reached, a short portion of the spring arms is additionally of linear formation, denoted by 77 in FIG. 4. The rounded spring arm end finds space in a recess on the inside of the housing top wall, denoted by 78 in FIG. 5.

The two hook-like members 22, the two shoes 69, the retentive coatings 26 and the spring arms 32 are all in each case arranged symmetrically with respect to the central plane of the device as a whole, and the two hook-like members 22 lie as exactly as possible on a line that is at right angles to this plane of symmetry. This means that the photograph to be changed then goes through the changeover operation without being rotated even when it is not guided by the slider member side pieces because it has dimensions smaller than its nominal ones. The dimensional tolerances of photographs are, in fact, with the same nominal size, different in the transverse and longitudinal direction: since the processing firms work with photographic paper from rolls of very accurately defined width and then cut the photographic paper up into different lengths, it is preferable to have the closer toleranced dimension of the photograph in a direction appropriate to that in which the slider member moves.

The completely separated individual picture, which until now has been described as being held only at its one edge, is lifted towards the window. For this, the leaf springs 30 already mentioned having forwardly-positioned arms 79 and rearwardly-positioned arms 80 are used, these arms holding and supporting the individual photograph, as seen clearly from FIG. 5, in such a manner that it is able to return to the pile again as the slider member is pushed back in. In the closed state of the device and during the withdrawal movement of the slider member, at least during the initial part thereof, the spring arms 79, 80 are pressed by the side pieces of the slider member into complementary grooves in the base of the housing which may be seen in FIG. 6.

At the start of the return movement of the slider member, the individual photograph is held by the spring arms 32 in front of the stop members 52 moulded on the housing and is supported in the direction of the separator bar at four points by the spring arms 79, 80. The other transverse edge of the photograph facing towards the separator bar may hang down; the side of the separator facing it is, however, sloped, somewhat like a wedge, so that the edge is raised gradually as the separator bar runs onto it. Between the top edge of the separator bar and the top wall of the housing there is a gap which is generously dimensioned for the passage of the photograph. The risk of the photograph striking against the edges facing it of the remainder of the pile transported by the slider member is countered by the top wall of the housing having holding-down lugs 81 on its inside which hold the pile below the level of the top side of the separator. These holding-down lugs are aligned with the ribs 40 so that they pass through the complementary recesses 42, 54 of the separator bar.

The slidable catch 38 is mounted so as to slide in the grip part and is biassed by a spring towards the housing, as readily recognisable from FIG. 3. As the slider member is inserted, the free edge 82 of the slidable catch strikes against a stop member 83 provided in the housing, as a result of which the slidable catch is pushed back into the grip part and does not project into the space visible through the housing window. Once the slider member has been pulled out, however, the slidable catch prevents the photographs lying in the slider member from falling out. To change the photographs, the slidable catch can be pushed back manually, which is facilitated by the finger-engageable edge 84. The photographs may be pushed out from the underside of the slider member by getting hold of them between the side pieces, or they may be grasped from above next to the grip part.

The construction of the spring system which is described above and illustrated, formed by the springs, cut in one piece and arranged symmetrically in pairs, with the spring arms 24 and 32, fulfils a total of five functions. Firstly, the hook-like members 22 moulded on them form the feeding means, the hook-like members finally taking along only one sheet into the separating means. Secondly, both arms together—or, more accurately, the four arms of the two springs—form a bias system with which the pile is neatly pressed against the window when the device is at rest. Thirdly, the arm 32, after it has been passed over by the separator, serves to convey the individual sheet to the housing top wall and there, fourthly, to hold it firmly. Fifthly, and finally, the arms 32 are arranged close enough to the retentive coatings 26 to be able, as a result of their bias force, to displace or peel off from the retentive coating any individual sheet which might adhere to the latter owing to a static charge. It is to be noted that the arm 32 is so shaped and arranged that it can be passed over by the separator bar without any disturbance to smooth operation.

In FIGS. 11 to 15, a further example of execution of a picture changer is illustrated. The slider member 14 is housed in the housing 12 so that it can slide; the housing 12 forms the first frame part, and the slider member 14 the second. The withdrawal travel is limited by means of a bearing eye 116 which is moulded onto one of the side pieces 44 of the slider member and runs onto a stop member 18 in the housing. The housing is screwed together from an upper shell 64 and a bottom shell 62, the outer rims of which engage in an inter-locking manner with each other, in the region between the side pieces 44 of the slider member and the outer edges of the housing which are parallel thereto. For this purpose, the bottom shell has in each case moulded-on guide sleeves 118 for screw shanks 120 and also recesses 122 on the outside for screw heads 124, while the upper shell carries for this purpose coaxially moulded-on bushings 126 in which the screws cut their own thread. The window 35 is clipped into the upper shell 64 and the parts of the upper shell lying beneath its outer border areas are not visible, owing to the fact that these areas of the window are frosted. In FIG. 11 the outline of the central transparent portion of the window is marked by 34.

With regard to operation, there are few differences compared with the example of execution according to FIGS. 1 to 10, so that it is sufficient to explain only the significant deviations.

Figure 16:
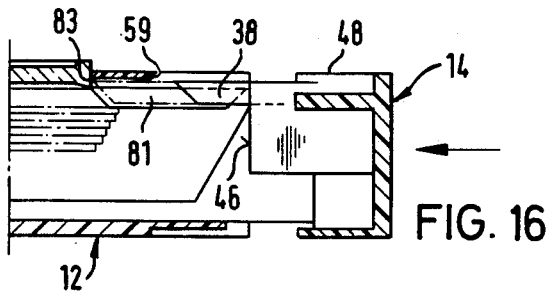
FIGS. 16 to 18 show in detail the operation of the holding-down member of the embodiment of FIGS. 1 to 10.
Figure 17:
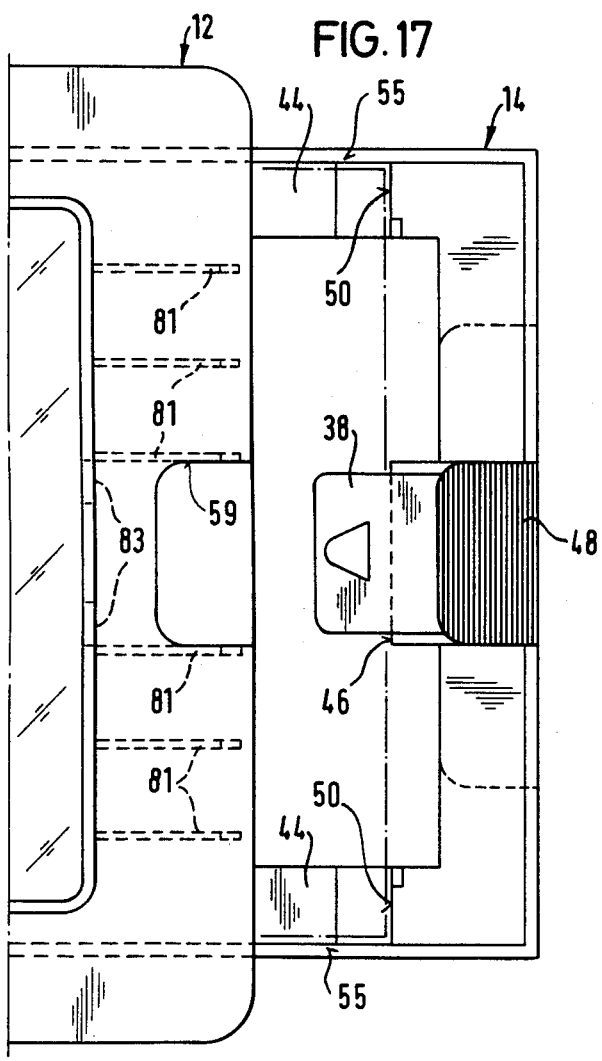
Figure 18:
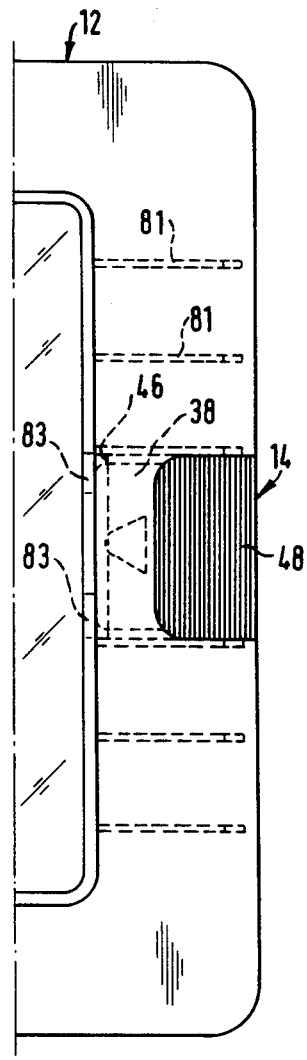

In this case the spring arms 24, 32 and 80 are combined into a stamped and bent part, positioned by means of projections 128 and fixed by crimping without the application of heat. The spring arms 79, however, are separate components which, as shown in FIG. 16 to 18, are positioned on the bottom shell by means of moulded-on projections and fixed by crimping without the application of heat. In order that this spring arm arrangement can raise up the separated picture as early as possible, the corresponding side piece 44 of the slider member has recesses 130. Secure holding of the separated picture is ensured during this phase of the changeover cycle by means of the spring arms 80, which bear the extreme edge of the picture remote from the slider member upwards like a bracket.

The two strips of retentive coating 26 are each arranged on a separately produced bar 134. On each side of the strip 26, the bar 134 may have moulded-on resilient bridge portions which, after the separator bar 20 has passed over them, spring out upwards and lift the edge of the picture, or separate metal leaf springs may be provided.

The bars 134 are mirror-symmetrical in shape and therefore have lands 68 at both ends with edges 72. The reason for this is that when the bars are to be coated automatically with the retentive coating no sorting is necessary. In addition, apertures 138 must of course be provided, through which project guide or wedge-like projections 140 for the separator bar which are moulded onto the bottom shell of the housing on the end at which it is gripped by the user. The bars are fixed in the bottom shell by pressing lugs into corresponding channels in the bottom shell of the housing, and they are accurately positioned by means of one of two pins, namely by means of the pin remote from the grip part of the slider member, while the other pin has associated with it a slot in the housing.

A compression spring 600 presses the slidable catch 38 acting as holding-down member over the pile of pictures. The compression spring 600 is seated on the side of the slider member 14 by means of a crossed-pins device 602 and on the side of the slidable catch 38 by means of the hollow housing 604 thereof. The slidable catch 38 is guided by the grooves 606 thereof which ribs 608 accommodate. The slidable catch 38 can be pulled back either by a rib 610 arranged at its upper side or by its lateral fluting 612. Two slots 614 in the slidable catch 38 receive guide ribs 616 on the grip part 48. The travel is limited by stop members 618, 620 on the grip part 48 and on the slidable catch 38, respectively, which stop members can be brought into engagement with one another.

In the withdrawn state of the slider member 14, the slidable catch 38 projects as far as possible towards the pile of pictures so that the pile is prevented from falling out. In this position, the slidable catch 38 can be grasped from above or at the side in order to pull back the slidable catch 38 to such an extent towards the grip part 48 that the pile of pictures is uncovered. If the slider member 14 is pushed back into the housing 12, the rib 610 strikes the stop member 83 before the slider member 14 has fully been pushed into the housing 12. By pushing the slider member 14 in fully, the slidable catch 38 is brought into a central position of withdrawal in which its free edge 82 is disposed in the region of the holding-down lugs 81 and is consequently not in the area visible through the window 35. In this position, the end region of the slidable catch 38 adjacent to its distal edge is disposed precisely so far over the pile of pictures that the slidable catch, even when the slider member 14 is in the pushed-in position, can exert its holding-down function, in addition to the holding-down lugs 81, in order to hold the uppermost picture of the pile spaced from the window 35.

FIGS. 16 to 18 show the slidable catch 38 cooperating with the housing 12, FIG. 17 corresponding to the position according to FIG. 1 in which the slidable catch 38 occupies its outer end position. If the slider member 14 is then pushed in, the slidable catch 38 strikes against the edge-type stop member 83 and is as a result pushed in slightly in relation to the grip part 48. To remove the pile of pictures, the slidable catch 38 can be pushed back manually even further until the pile is released.

FIGS. 19 and 20 show an embodiment of a slidable catch 38 which is automatically locked in its innermost position in relation to the grip part 48. For this purpose there are linked to the slidable catch 38 two spring arms 526 which, although during the normal changeover operation are deflected inwards, are not yet able to lock into guide means 528. Only when the slidable catch 38 is fully pressed in does locking occur at a stepped portion 530. If the slider member 14 is then introduced into the housing 12 again, the spring arms 526 strike against the ribs 81 and are thereby released. The arrows 532 and 534 indicate the partially pushed-in and fully pushed-in positions, respectively, of the slidable catch 38.

I claim:

1. A container for a pile of substantially rectangular sheets of substantially identical format, comprising:
   a housing having a window for display of substantially all of an uppermost sheet of the pile in the container, said window defining a plane, said housing having a plurality of narrow sides perpendicular to said plane and having an opening in one of said narrow sides;
   a sheet supporting slider reciprocable through said housing opening in a direction parallel to said plane between an inner end position and an outer end position, said slider having a front wall which, in said inner end position, is substantially coextensive with said housing opening;
   a pile hold-down member mounted on said slider adjacent the front wall thereof and being displaceable relative to said slider member substantially in a plane parallel to the plane of said window to engage, in said outer end position, over said at least one sheet conveyed out of the housing in the slider; and
   spring means for biasing said hold-down member into said sheet engaging position; wherein:
   when the slider is moved into said inner end position, said hold-down member is displaced against bias of said spring means into a position out of registration with said window.

2. The container of claim 1 wherein said hold-down member is displaceable against said spring bias into a position permitting removal sheets from the slider.

3. The container of claim 1 wherein said hold-down member is displaceable against said spring bias by means of a stop member engaged by said hold-down member upon said slider approaching its inner end position, said stop member being mounted on said housing.

4. The container of claim 3 wherein said hold-down member in said inner end position assumes a displaced position in which it just overlaps ends of sheets in the container.

5. The container of claim 1 wherein said hold-down member has a sheet engaging side facing away from said window, said side defining a plane spaced from an inner window surface.

6. The container of claim 5, wherein said housing has inwardly protruding hold-down elements engaging over those sheet edges which are engaged by said displaceable hold-down member, said hold-down elements defining at least the same spacing from said inner window surface as does the sheet engaging side of said displaceable hold-down member.

7. The container of claim 6 wherein said displaced position is intermediate a fully extended position and a fully retracted sheet removal position of said hold-down member.

8. The container of claim 1 wherein the slider has a grip portion extending into a housing recess, and said hold-down member is mounted on said grip portion.

9. The container of claim 8 wherein said grip portion accommodates a bias spring for said hold-down member.

10. The container of claim 3 wherein said hold-down member is displaceable in a direction substantially parallel to the direction of movement of said slider.

11. The container of claim 3 wherein said hold-down member, when the slider is in its inner end position, is at least partially covered by a housing wall.

12. The container of claim 1 wherein said hold-down member has at least one indentation facilitating finger engagement.

13. The container of claim 10 wherein said slider and said hold-down member have interengaging rib-and-groove guide means for guiding the hold-down member longitudinally of the slider.

14. The container of claim 1 wherein said hold-down member has a wedge-shaped free end facilitating engagement over sheet ends.

15. The container of claim 2 including means for locking and manually unlocking said hold-down member in its sheet removal position.

16. The container of claim 15 wherein manual unlocking is accomplished by pushing the slider into the housing.

17. The container of claim 16 wherein said locking means includes projecting spring arms displaced into an unlocking position by engaging stop members on the housing.

18. The container of claim 1 including means for cyclically rearranging a pile of sheets from one pile end to the other pile end.

19. The container of claim 18 wherein, upon withdrawal of the slider, the individual sheet remote from the housing window remains in the housing while the slider transports the remaining sheets out of the housing, and upon pushing the slider into the housing, said individual sheet is introduced between said pile remainder and said window.

20. The container of claim 1 wherein said hold-down member engages over said at least one sheet adjacent the central region of its end.

21. The container of claim 4 wherein said hold-down member in said displaced position is out of registration with said window.

22. The container of claim 7 wherein said hold-down elements are located laterally with respect to said hold-down member with the slider in its inner end position.

23. The container of claim 22 wherein said hold-down elements are located adjacent said displaceable hold-down member.

24. The container of claim 12 including a plurality of indentations.

25. The container of claim 5 wherein said hold-down member is displaceable within a space between said inner window surface and said plane.

26. The container of claim 21 wherein said window has a contour adjacent said housing opening, and said hold-down member having a distal end close to said contour in said inner slider end position.

27. The container of claim 26 wherein said hold-down member is displaceable against said spring bias into a position permitting sheet removal from the slider in its outer end position.

28. The container of claim 27 wherein said slider has a grip portion and said hold-down member is mounted on said grip portion.

29. The container of claim 1 wherein said hold-down member is linearly displaceable substantially parallel to said plane.

30. A container for a pile of substantially rectangular sheets of substantially identical format, comprising:
- a housing having a window for display of substantially all of an uppermost sheet of the pile in the container, said window defining a plane, said housing having a plurality of narrow sides perpendicular to said plane and having an opening in one of said narrow sides;
- a sheet supporting slider reciprocable through said housing opening in a direction parallel to said plane between an inner end position and an outer end position, said slider having a front wall which, in said inner end position, is substantially coextensive with said housing opening;
- pile hold-down means including a hold-down member mounted on said slider adjacent the front wall thereof; and
- hold-down member engaging means disposed on said housing and cooperating with said hold-down member for displacing said hold-down member between a first, sheet engaging position when the slider is out of said housing, and a second position out of registration with said window when the slider is in said inner end position.

31. The container of claim 30 wherein said hold-down member is linearly displaceable substantially parallel to said plane.

32. The container of claim 3 wherein said hold-down member is displaceable in a direction parallel to the direction of movement of said slider.

33. The container of claim 30 including first displacing means for displacing said hold-down member in a first direction so as to engage over sheet ends.

34. The container of claim 33 wherein said first displacing means includes a bias spring.

35. The container of claim 34 including means for locking said slider in its inner end position against bias.

36. The container of claim 33 including second displacing means for displacing said hold-down member in a second direction opposite said first direction.

37. The container of claim 36 wherein said first displacing means include a bias spring, and said second displacing means include a stop member on said housing, said stop member being engaged by said hold-down member when said slider is in its inner end position.

38. The container of claim 30 including means for transferring, upon each slider reciprocation, a sheet from one pile end to the other pile end.

39. The container of claim 38 including means for retaining, upon slider withdrawal, an individual sheet in the housing and the remainder of the pile in the slider.

40. The container of claim 38 further including a rotation-preventing means for securing the sheet being transferred against rotation about an axis perpendicular to its principal plane.

41. The container of claim 38 further including a retaining device provided on said housing, said retaining device comprising first and second retaining means, said first retaining means holding the sheet being transferred adjacent the inner end position, said second retaining means holding the sheet being transferred adjacent the outer end position, said second retaining means holding the sheet being transferred between said inner and outer end positions.

42. A container for a pile of substantially rectangular sheets of substantially identical format, comprising:
- a housing having a window for display of substantially all of an uppermost sheet of the pile in the container, said window defining a plane, said housing having a plurality of narrow sides perpendicular to said plane and having an opening in one of said narrow sides;
- a sheet supporting slider reciprocable through said housing opening in a direction parallel to said plane between and inner end position and an outer end position, said slider having a front wall which, in said inner end position, is substantially coextensive with said housing opening; and
- a sheet hold-down member mounted on said slider;

wherein:
- said slider has first and second stop means and said housing has third stop means; and
- said hold-down member is displaceable between an extended sheet overlapping position defined by said first stop means and a retracted sheet releasing position defined by said second stop means, said hold-down member being further displaceable from said extended position into an intermediate position defined by said third stop means when said slider is in the inner end position.

43. The container of claim 42 wherein said hold-down member is linearly displaceable substantially parallel to said plane.

44. The container of claim 43 wherein said hold-down member is displaceable in a direction parallel to the direction of movement of said slider.

* * * * *

UNITED STATES PATENT AND TRADEMARK OFFICE
CERTIFICATE OF CORRECTION

PATENT NO.  :  4,780,976
DATED       :  November 1, 1988
INVENTOR(S) :  Peter Ackeret It is certified that error appears in the above-identified patent and that said Letters Patent is hereby corrected as shown below:

Column 1, line 12, "5,259,802" should be -- 4,259,802 --;

line 55, "holding down" should be
  -- holding-down --;

line 59, "abovede-" should be -- above-de- --.

Column 3, line 50, "frrthest" should be -- furthest --.

Claim 10, column 9, line 4, "3" should be --8--.

Claim 32, column 10, line 31, "3" should be -- 31 --.

Signed and Sealed this

Third Day of December, 1991

Attest:

HARRY F. MANBECK, JR.

Attesting Officer        Commissioner of Patents and Trademarks